(12) United States Patent
Nath

(10) Patent No.: US 7,876,721 B2
(45) Date of Patent: Jan. 25, 2011

(54) SLEEP SCHEDULING FOR GEOGRAPHICALLY DISTRIBUTED NETWORK NODES

(75) Inventor: Suman K. Nath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 949 days.

(21) Appl. No.: 11/738,306

(22) Filed: Apr. 20, 2007

(65) Prior Publication Data

US 2008/0259875 A1    Oct. 23, 2008

(51) Int. Cl.
H04B 7/185    (2006.01)

(52) U.S. Cl. ............... 370/318; 370/400; 370/401; 370/332; 455/343.1; 455/343.4

(58) Field of Classification Search ............ 370/318, 370/400, 401, 332; 455/343.1, 343.4
See application file for complete search history.

(56) References Cited

U.S. PATENT DOCUMENTS

| 6,859,831 | B1 | 2/2005 | Gelvin et al. |
| 7,551,892 | B1 * | 6/2009 | Elliott ................ 455/41.1 |
| 2003/0099221 | A1 * | 5/2003 | Rhee .................. 370/338 |
| 2004/0125776 | A1 | 7/2004 | Haugli et al. |
| 2004/0230638 | A1 | 11/2004 | Balachandran et al. |
| 2006/0120303 | A1 | 6/2006 | Yarvis et al. |
| 2006/0140135 | A1 | 6/2006 | Bonta et al. |
| 2006/0167985 | A1 | 7/2006 | Albanese et al. |
| 2006/0171344 | A1 | 8/2006 | Subramanian et al. |
| 2006/0209715 | A1 | 9/2006 | Kushalnagar et al. |
| 2006/0258322 | A1 | 11/2006 | Conner et al. |
| 2008/0132211 | A1 * | 6/2008 | Keshavarzian et al. ... 455/414.1 |

OTHER PUBLICATIONS

Giordano, et al., "Position Based Routing Algorithms for Ad Hoc Networks: A Taxonomy", available at least as early as Feb. 28, 2007, at <<http://www.site.uottawa.ca/~ivan/routing-survey.pdf>>, pp. 1-21.
Paruchuri, et al., "Random Asynchronous Wakeup Protocol for Sensor Networks", available at least as early as Feb. 28, 2007, at <<http://bit.csc.lsu.edu/~durresi/papers/BROADNETS_04.pdf>>, IEEE, 2004, pp. 1-8.
Qie, et al., "Scheduling Computations on a Software-Based Router", available at least as early as Feb. 28, 2007, at <<http://delivery.acm.org/10.1145/380000/378425/p13-qie.pdf?key1=378425&key2=5628462711&coll=GUIDE&dl=GUIDE&CFID=12312792&CFTOKEN=38824869>>, ACM, 2001, pp. 13-24.
Sichitiu, "Cross-Layer Scheduling for Power Efficiency in Wireless Sensor Networks", available at least as early as Feb. 28, 2007, at <<http://www4.ncsu.edu/~mlschit/Research/Publications/powerSchedule.pdf>>, pp. 1-11.

* cited by examiner

Primary Examiner—Rafael Pérez-Gutiérrez
Assistant Examiner—Liton Miah
(74) Attorney, Agent, or Firm—Lee & Hayes, PLLC

(57) ABSTRACT

Techniques for implementing sleep scheduling in a distributed network environment are described. The sleep scheduling attempts to optimize routing of communication among nodes of the distributed network, while still conserving energy by allowing nodes to occasionally transition to sleep mode. The sleep scheduling is performed as a function of the number of awake neighboring nodes.

16 Claims, 4 Drawing Sheets

SLEEP SCHEDULING FOR GEOGRAPHICALLY DISTRIBUTED NETWORK NODES

BACKGROUND

A wireless distributed network includes a plurality of nodes that communicate with each other, to transmit one or more messages to a destination location. The nodes can be deployed over a large area, providing a combination of communication paths between a source and the destination. The nodes, however, are not continuously involved in the transmission of messages. Moreover, at any given instance, not all nodes are required for message transmission. To conserve energy, the nodes are maintained alternately in an active (awake) state and an inactive (asleep) state by implementing a sleep scheduling algorithm.

A typical sleep scheduling algorithm selects one or more nodes to remain awake at a given instance, placing the remaining nodes in a minimal power or sleep mode. The number of awake nodes may change for different instances in order to increase network lifetime by distributing one or more network related activities, for example, processing, routing, and so on, across all the nodes in the network. A sleep scheduling algorithm may seek to maintain a set of active nodes so that every point of deployment space is covered and hence maintain a connected backbone. The connected backbone is structured in a manner that allows inactive nodes to be immediate neighbors to nodes that are awake.

Too many active nodes at any given instance results in energy loss and too few active nodes may result in the loss of transmission. Accordingly, there is an ongoing need to improve sleep scheduling techniques.

SUMMARY

Techniques for implementing sleep scheduling in a distributed network environment are described. The sleep scheduling attempts to optimize routing of communication among nodes of the distributed network, while still conserving energy by allowing nodes to occasionally transition to sleep mode. The sleep scheduling is performed as a function of the number of neighboring nodes that are awake.

This summary is provided to introduce concepts relating to sleep scheduling in a distributed network. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
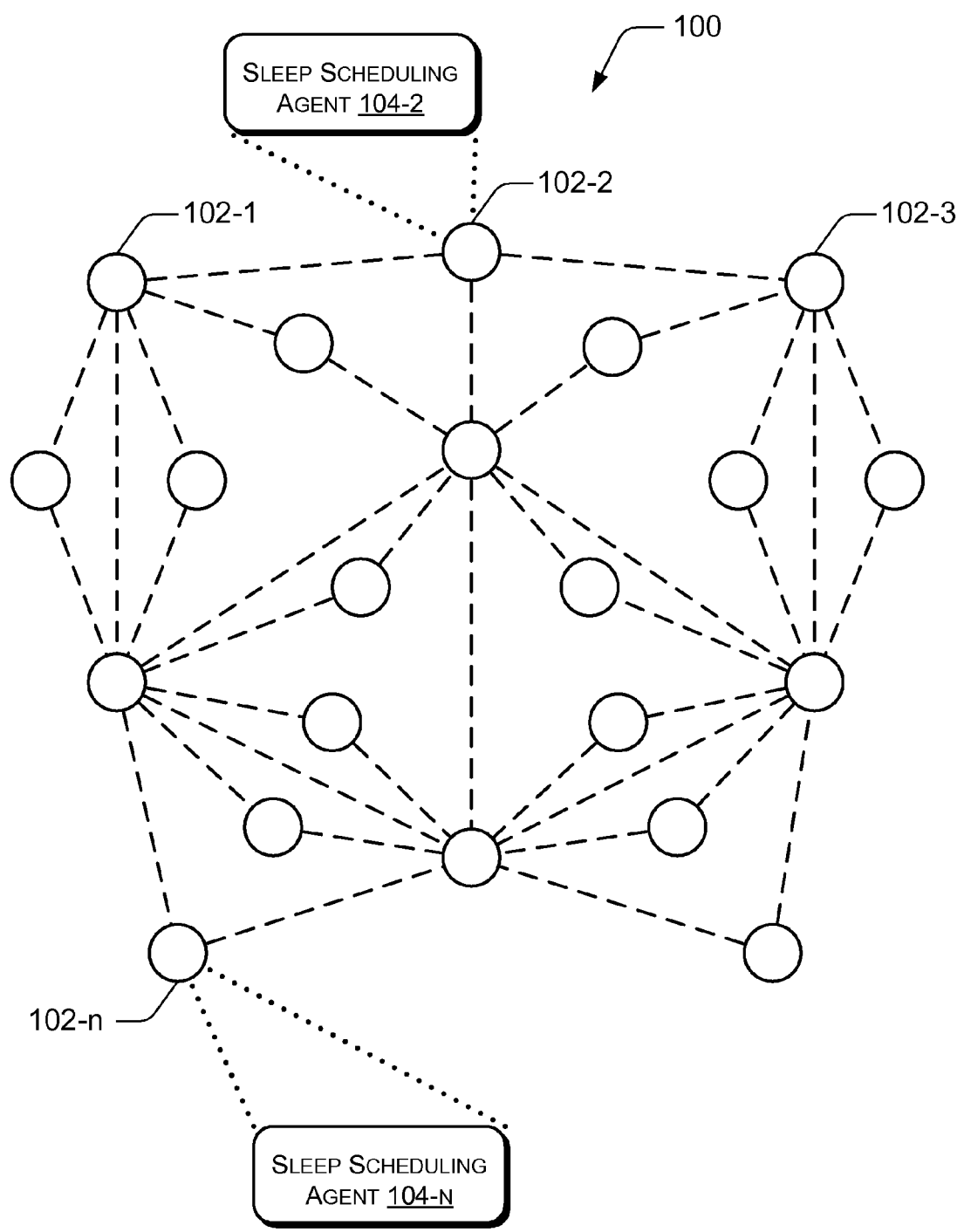
FIG. 1 illustrates an exemplary network implementing sleep scheduling for geographically distributed network nodes.

This disclosure describes techniques for scheduling sleep activity of nodes in a distributed network. The distributed network includes one or more nodes that are connected to each other through wireless or wired means. The nodes may be connected to each other directly or indirectly through one or more other nodes. The nodes connected to each other directly can be referred to as immediately neighboring nodes. Other nodes, though connected indirectly to a given node, nevertheless can be considered to lie within its neighborhood. A node that is connected to the given node through one or more nodes can be said to be present within an "n-hop neighborhood" of the given node. For example, if the node is connected to the given node through (n−1) number of nodes, then it lies within an n-hop neighborhood of the given node.

The nodes transmit communications amongst themselves, allowing transmission from a source to a destination. At any given instance of time, not all nodes are involved in transmission. The nodes are therefore maintained in either an awake state for full operation or in a sleep state to conserve power. An awake node would be an active participant in transmission, and when not required for transmission, can be allowed to go into a sleep state. A node in the sleep state or a sleeping node, however, does not take part in transmission and hence, can be considered to be disconnected from the distributed network. An independent scheduling technique may be present that dictates the awakening of the sleeping nodes. The state of each of the awake nodes is controlled by sleep scheduling techniques as described herein.

The techniques for sleep scheduling include determining the number of immediately neighboring awake nodes for all nodes in the network and deciding whether a node under consideration should stay awake or can be allowed to go to sleep. For the purposes of this description, immediately neighboring awake nodes will be interchangeably referred to as neighboring nodes. The sleep scheduling mechanism is based on the number of neighboring nodes that should be awake at any given instance. This number of nodes can be derived as a function of a desired routing performance. A given node is then allowed to go to sleep or remain awake on the basis of the implemented sleep mechanism.

To this end, a sleep scheduling algorithm can be implemented through one or more agents residing at individual nodes within the distributed network. The sleep scheduling algorithm ensures that the nodes that are allowed to go to sleep vary with each cycle of the sleep scheduling. The agents can be instructed to periodically repeat the sleep scheduling for all nodes. Each application of the sleep scheduling algorithm is referred to as a sleep scheduling cycle. The agents monitor one or more nodes that may be awake in the immediate neighborhood of a given node. For given node, the agents are configured to instruct the given node to stay awake if the number of the neighboring nodes is less than, or in some cases equal to, a predefined threshold value.

If the number of neighboring nodes exceeds the threshold limit, the agent evaluates whether the neighboring nodes are also members of an ordered set of nodes. The agent performs a two fold determination utilizing the ordered set, as will be described below. On the basis of such determinations, the agent allows the given node to go to sleep or instructs the given node instructions to remain awake.

While aspects of described techniques relating to sleep scheduling in a distributed network can be implemented in any number of different computing systems, environments, and/or configurations, embodiments are described in the context of the following exemplary system architecture(s).

Exemplary Network

FIG. 1 illustrates an exemplary network 100 in which sleep scheduling can be implemented. Network 100 includes one or more node devices 102-1, 102-2, 102-3, . . . , 102-n. Each of the nodes in the network 100 is connected to one or more other node devices. The node devices (or simply "nodes") can be coupled to each other in various combinations (e.g., LAN, WAN, etc.) through wired and/or wireless technologies known in the art. In this manner, the coupled nodes 102 form a geographically distributed network over which messages, signals, or other data can be transferred from a source to a destination. The distributed network 100 is representative of many diverse implementations, such as a cellular network, a sensor network of physical sensor devices (for example, temperature sensors, traffic sensors, webcams, etc.), and so forth.

Each node device (referenced generally as "102" or nodes 102) in the distributed network 100 includes a sleep scheduling agent, as represented by the agent 104-2 associated with the node 102-2, the agent 104-n associated with the node 102-n, and so on for the remaining nodes 102 of the network 100. The sleep scheduling agent (referenced generally as "104") is capable of implementing a sleep schedule cycle for its corresponding node.

As indicated previously, the nodes 102 are alternatively maintained in an active state or a sleep state to conserve energy, and the sleep scheduling agent 104 controls their state based on a number of factors. Of particular interest, the scheduling agent 104 attempts to ascertain which nodes should sleep in order to reduce power usage (thereby prolonging device and network life) as a function of optimizing geographical routing paths through the network 100 so that messages can be effectively transferred from source to destination.

More specifically, the sleep scheduling agents 104 are capable of scheduling the sleep cycle of associated node devices 102-1 . . . n. Each sleep scheduling agent 104 takes into account the states of neighboring nodes. A neighboring node is a node that is directly connected (wired or wirelessly) to the given node (i.e., it is one-hop away). The sleep scheduling agent 104 minimizes the average number of awake nodes devices 102 in the distributed network 100. In this manner, the sleep scheduling agent 104 ensures that when a sleep scheduling cycle has to be performed, all the awake nodes node devices 102 will be connected to each other and each of node devices 102-1 . . . n will have an awake neighbor. The working of sleep scheduling agent 104 is further exemplified in conjunction with FIG. 2.

Exemplary Node

Figure 2:
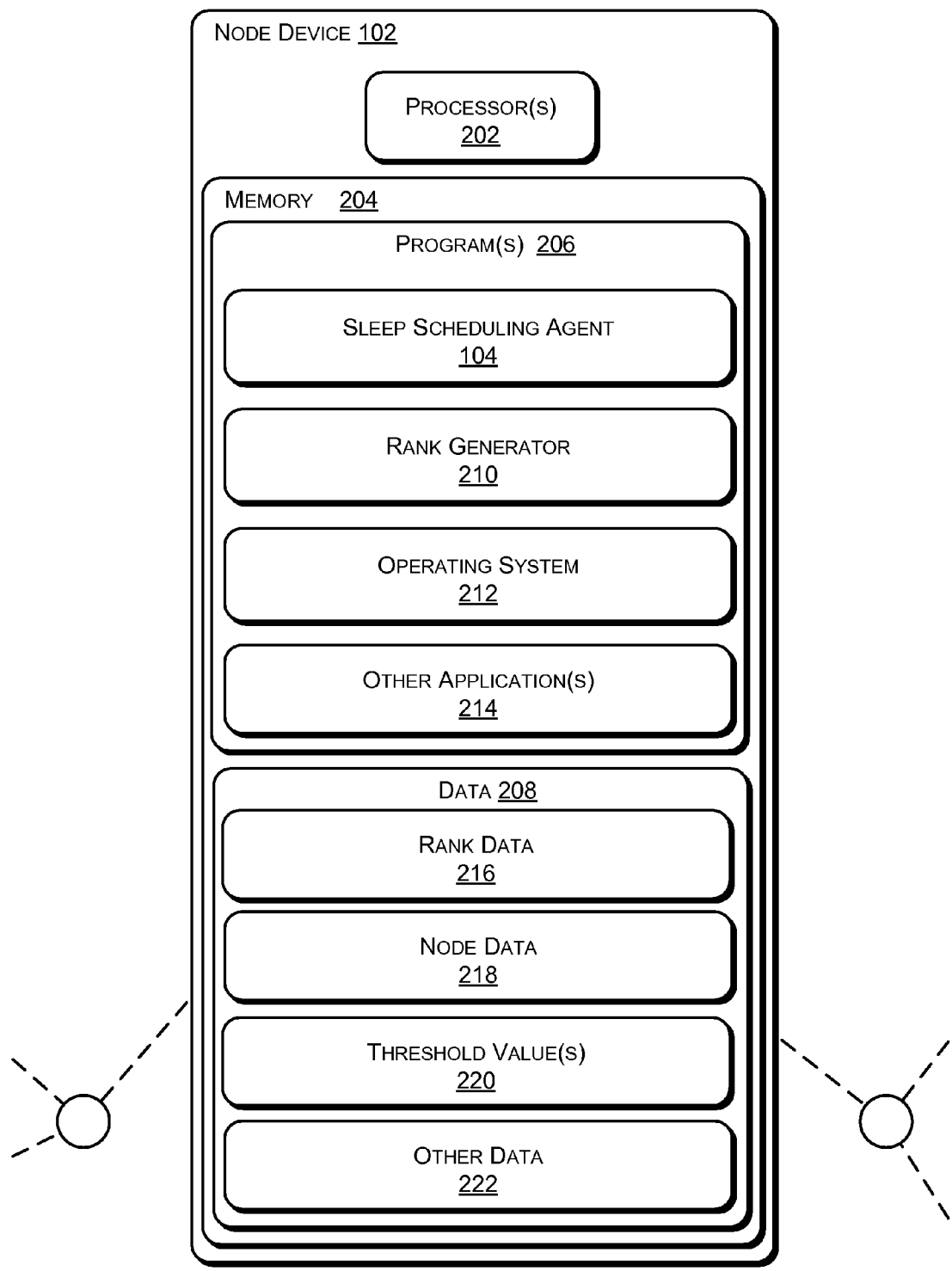
FIG. 2 is a block diagram showing an exemplary node device.

FIG. 2 illustrates relevant exemplary components of a node 102. It can include one or more processor(s) 202 and a memory 204. The processor(s) 202 may include microprocessors, microcomputers, microcontrollers, digital signal processors, central processing units, state machines, logic circuitries, and/or any devices that manipulate signals based on operational instructions. Among other capabilities, the processor(s) 202 are configured to fetch and execute computer-readable instructions stored in the memory 204.

The memory 204 can include any computer-readable medium known in the art including, for example, volatile memory (e.g., RAM) and/or non-volatile memory (e.g., flash, etc.). As illustrated in FIG. 2, the memory 204 can also include program(s) 206 and data 208. The program(s) 206 can include one or more program modules, for example, sleep scheduling agent 104, rank generator 210, operating system 212, and other applications 214. Other application(s) 214 can include programs that supplement the program modules on the nodes. The other application(s) 214 can perform functions such as measuring and recording various external physical parameters like temperature, available battery power, and such.

The data 208 include, for example, rank data 216, node data 218, threshold value(s) 220 and other data 222. The other data 222 include data that may be generated as a result of execution of one or more program(s) 206.

As indicated previously, the sleep scheduling agent 104 allows a given node, for example node 102-1 (hereinafter referred to as evaluated node 102), to go to sleep or stay awake on the basis of its neighboring nodes. The following description is presented in relation to the evaluated node 102. The same description is also applicable to other nodes 102, each of which is considered in turn as being the evaluated node.

The sleep scheduling agent 104 monitors the number of active neighbors for evaluated node 102. In addition, the sleep scheduling agent 104 assigns a rank to each node and identifies a set of nodes that is ordered based on rank. These data are used by the sleep scheduling agent 104 to determine whether the evaluated node 102 should remain awake or should be allowed to go to sleep. Each sleep scheduling agent 104 is responsible for scheduling the sleep cycle for the node on which it resides.

During each sleep scheduling cycle, agent 104 assigns unique rank values to each node; no two nodes have the same rank. The values are random during each sleep scheduling cycle, which has the effect of distributing sleep cycles more or less evenly across different nodes. The same rank values are used within any particular sleep scheduling cycle, regardless of the particular node being evaluated. The use of the rank values will become apparent in the following discussion.

Once a rank is allotted to each of the nodes 102, the sleep scheduling agent 104 exchanges the rank data 216 associated with the nodes 102 amongst all the nodes. The ranks of the nodes 102 are exchanged in a manner such that each of the nodes 102 is aware of the ranks of all its neighboring nodes. In turn, the neighboring nodes are further aware of the ranks of their further neighboring nodes, and so on. For example, the ranks associated with the evaluated node 102 and its immediate neighbors are exchanged such that the evaluated node 102 is aware of all ranks associated with its immediate neighbors and vice versa. In another implementation, each of the nodes 102 can communicate the ranks amongst themselves by other techniques such as broadcasting or other similar techniques.

During a sleep scheduling cycle, the sleep scheduling agent 104 monitors or determines the number of awake neighboring nodes for a particular evaluated node 102. If the number of awake neighboring nodes is less than a predetermined value, for example threshold value(s) 220, the sleep scheduling agent 104 instructs the evaluated node 102 to remain active.

In cases where the number of neighboring nodes is greater than the threshold value(s) 220, the sleep scheduling agent 104 performs further evaluations to determine whether the evaluated node should remain active. In particular, the sleep scheduling agent 104 of any particular evaluated node identifies an ordered set of nodes corresponding to that evaluated node, comprising those immediately neighboring nodes having a rank value less than the rank value of the evaluated node.

In such a manner an immediately neighboring node is potentially part of various different ordered sets, corresponding to different evaluated nodes. A neighboring node, in turn, will have its own corresponding ordered set of lesser ranked nodes. Thus, each node is associated with an ordered set of lesser ranked neighboring nodes, which in turn are associated with even lesser ranked neighboring nodes, and so on. By traversing these associations, it is possible to find whether or not any two given nodes are either directly or indirectly connected.

In cases where the number of neighboring nodes is greater than the threshold value(s) 220, the sleep scheduling agent 104 allows a particular evaluated node 102 to go to sleep or stay awake depending on a two-fold determination based on those nodes that are part of the corresponding ordered set. One of the determinations involves scanning within the corresponding ordered set for a pair of nodes that meets the following qualification(s): (a) the pair of nodes within the ordered set are connected directly, i.e. are neighboring nodes to each other; or (b) they are connected indirectly through intermediate nodes, wherein these intermediate nodes have a rank less than the rank of the evaluated node 102. For efficiency, the node 102 can check these constraints only within the n-hop neighborhoods. In one implementation, n equals 2, meaning that each intermediate node is within 2 hops of the evaluated node 102.

If there is at least one node pair that does not match the criteria above, the evaluated node 102 is instructed by the sleep scheduling agent 104 to remain active. If, however, all the node pairs are found to fulfill the above criteria, the second part of the two-fold determination is made to decide whether or not the evaluated node 102 should be allowed to go to sleep. In one implementation, the further determination involves scanning all neighboring nodes of the evaluated node 102. The neighborhood of the evaluated node 102 is scanned to determine how many nodes from the corresponding ordered set are immediate neighbors of the scanned node. If this number exceeds a minimum predefined threshold for all scanned nodes, the sleep scheduling agent 104 instructs the evaluated node 102 to enter a sleep state. Otherwise, the sleep scheduling agent 104 instructs the evaluated node 102 to remain awake.

The two fold determinations are independent of each other. Either of the determinations can be performed first without affecting the outcome. Furthermore, the described process can be extended to all the nodes 102 included in the distributed network 100. In this manner, the distributed sleep scheduling agents 104 ensure that for any given node, a minimum number of neighboring nodes are awake for a successful transmission.

The following provides this implementation of the sleep scheduling algorithm in pseudo code, which is run at each node 102, where k is an input parameter representing the required minimum number of awake neighbors per node:

---

1. Pick a random rank $rank_u$.
2. Broadcast $rank_u$ and receive the ranks of currently awake neighbors $N_u$.
   Let $R_u$ be the set of these ranks.
3. Broadcast $R_u$ and receive $R_v$ from each $v \in N_u$.
4. If $|N_u| < k$ or $|N_v| < k$ for any $v \in N_u$, remain awake.
   Return.
5. Compute $Cu = \{v | v \in N_u \text{ and } rank_v < rank_u\}$
6. Go to sleep if both the following conditions hold. Remain awake otherwise.
   Any two nodes in $C_u$ are connected either directly themselves or indirectly through nodes within u's 2-hop neighborhood that have rank less than $rank_u$.
   Any node in $N_u$ has at least k neighbors from $C_u$.
7. Return.

---

Exemplary Processes

Figure 3:
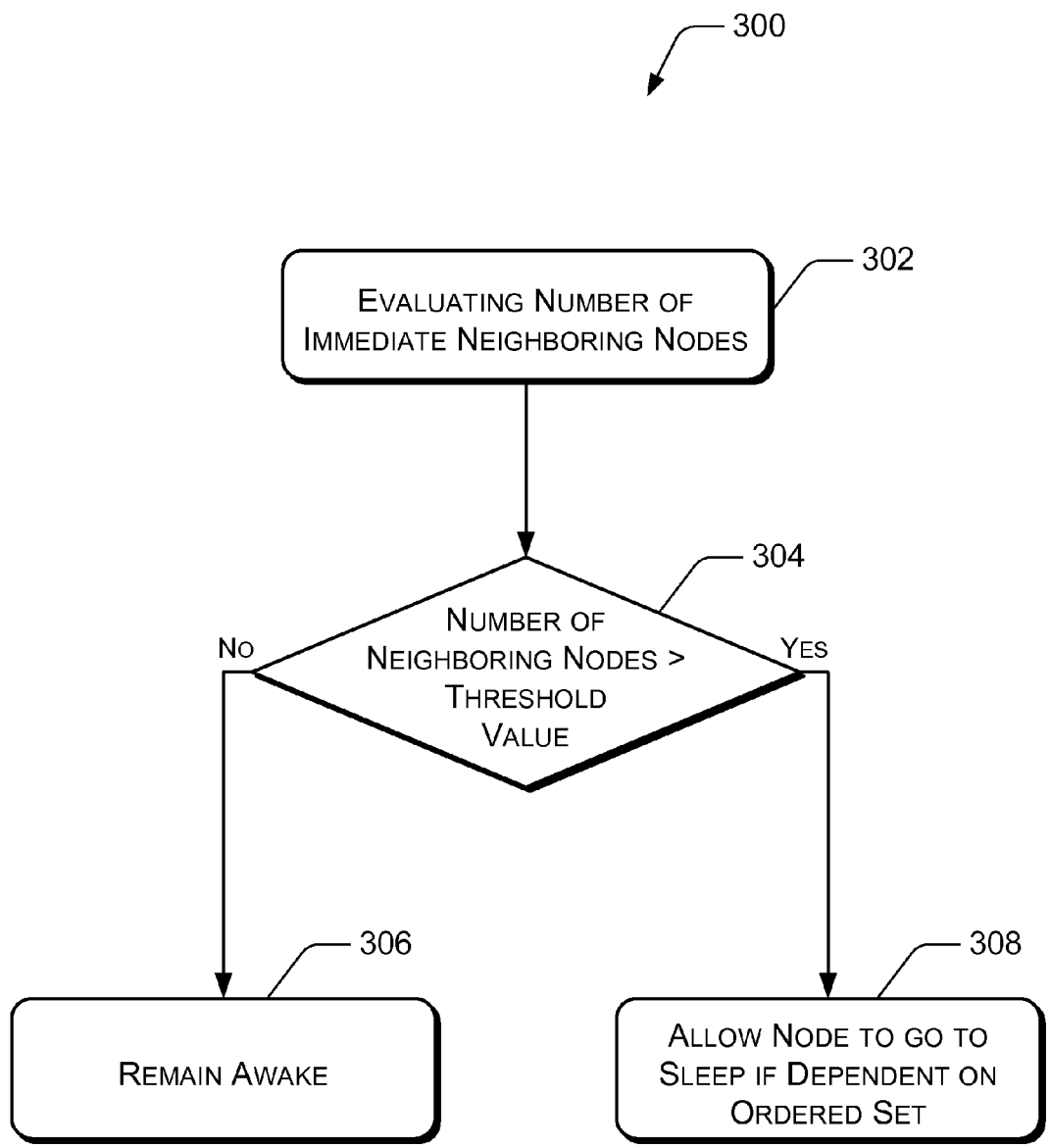
FIGS. 3 and 4 are flow diagrams illustrating exemplary processes for scheduling sleep of nodes in a distributed network.

FIG. 3 illustrates an exemplary process 300 for scheduling a sleep cycle for one or more nodes. The process 300 (as well as other processes described below) is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, the process 300 (as well as other processes described below) is described with reference to the network 100 shown in FIG. 1 and component block of the nodes 102 shown in FIG. 2.

Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein.

In the exemplary implementations, sleep scheduling is implemented to alternate the active state of a given node. Alternating the state of the node conserves power, thereby prolonging device and network life.

Note also that the acts of FIG. 3 are performed individually with respect to each of the nodes 102 in the network. For purposes of discussion, the node currently being evaluated will be referred to as the evaluated node.

At block 302, the number of immediately neighboring nodes for the evaluated node is determined.

At block 304, the determined number of immediately neighboring nodes is compared with a threshold value. For example, the sleep scheduling agent 104 compares the number of neighboring nodes of the evaluated node 102 with threshold value(s) 220. The threshold value(s) 220 can be established to indicate the minimum number of nodes in the immediate neighborhood of evaluated node 102 that should always be active, so as to guarantee transmission of an intended message. In another implementation, threshold value(s) 220 can be obtained by optimizing geographical routing paths through the network 100 for effective transmission of communication between a source and destination.

If the number of neighboring nodes is less than the threshold value ('no' path from block 304), the given node is instructed to remain awake (block 306). For example, the sleep scheduling agent 104 instructs the evaluated node 102 to remain awake if the number of its neighboring nodes is less than the threshold value(s) 220. In this manner, if the neighboring nodes of the evaluated node 102 are few, then the evaluated node 102 is not allowed to go to sleep. As indicated previously, this ensures a sufficient number of awake nodes in the proximity of the evaluated node 102.

Alternately, if the neighboring nodes of the given node meet or exceed the threshold value ('yes' path from block 304), the evaluated node is allowed to go to sleep, subject to certain conditions relating to an ordered set of nodes associated with the evaluated node. In one implementation, the sleep scheduling agent 104 allows the evaluated node 102 to go to sleep or stay awake depending on the association between the ordered set 222 and the evaluated node 102. The manner in which the association between evaluated node 102 and ordered set 222 is determined is exemplified in conjunction with FIG. 4.

Figure 4:
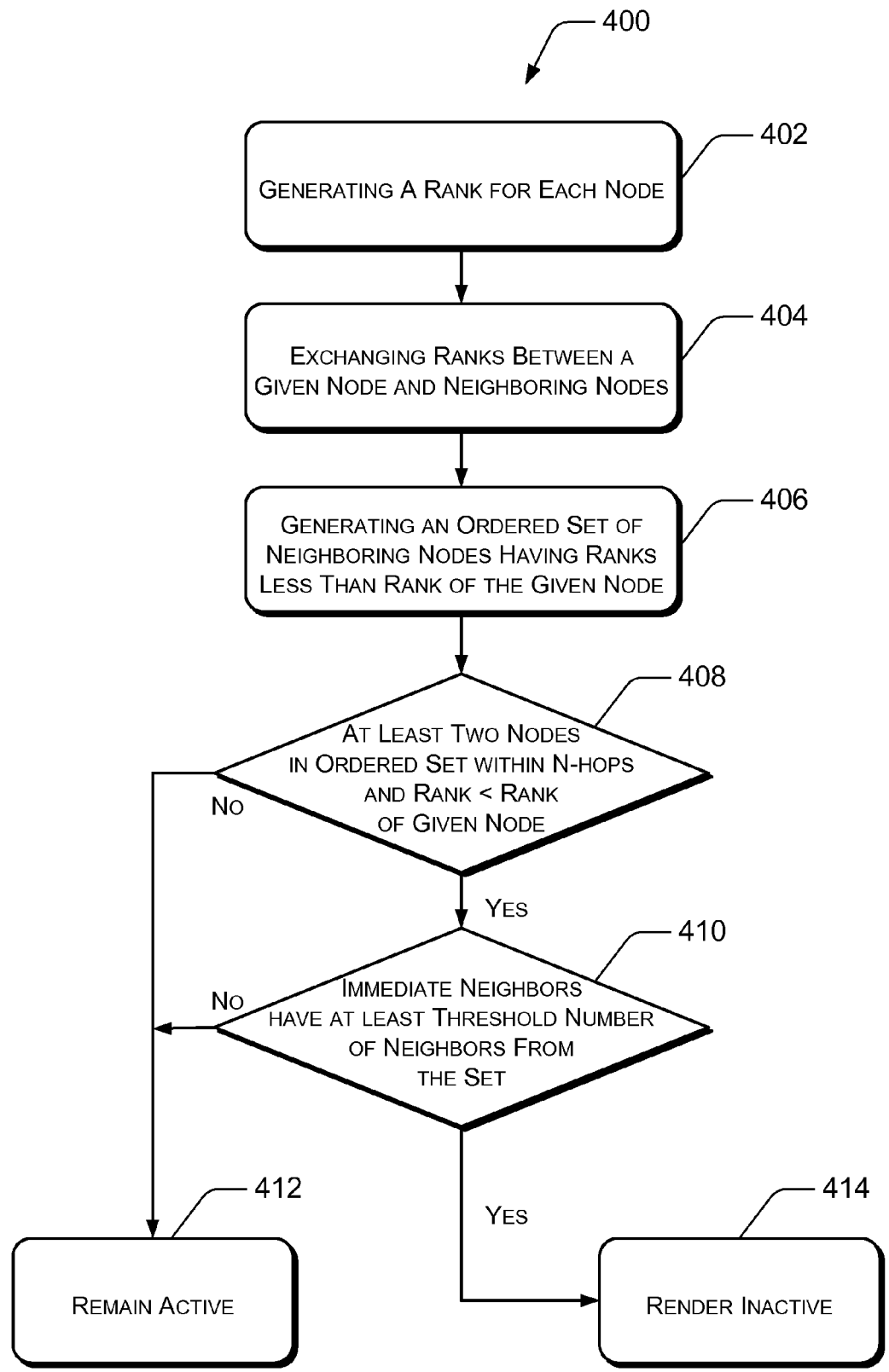

FIG. 4 illustrates an exemplary process 400 for determining an association between a given node, for example evaluated node 102, and its corresponding ordered set of nodes.

At block 402, a rank is generated for each of the nodes that are part of a distributed network. The rank value or rank that is generated is a unique value that can be generated randomly.

At block 404, ranks of the evaluated node and its immediately neighboring nodes are exchanged, thereby allowing each of the nodes to be aware of the ranks of its neighboring nodes and vice versa. Note that ranks and associated data can be communicated amongst the nodes by other methods, such as broadcasting of ranks by each one or more of nodes 102.

At block 406, an ordered set is created for each evaluated node. The ordered set identifies those nodes having a rank less than the rank of the evaluated node.

At block 408, a further determination is made to ascertain presence of at least two nodes in the ordered set that are: (a) connected to each other directly; or (b) connected indirectly through nodes within an n-hop neighborhood of the evaluated node. In addition, the nodes connecting these nodes should have ranks lower than the rank of the evaluated node. In one implementation, the sleep scheduling agent 104 scans the ordered set 222 for at least two nodes that are connected to each other directly or indirectly.

In one implementation, the at least two nodes should be connected by intermediate nodes that lie within a 2-hop neighborhood of the evaluated node 102.

If no such nodes are found by the sleep scheduling agent 104 ('no' path from block 408), the evaluated node 102 is instructed to remain awake (block 412). Such a determination indicates that not enough nodes may be active in the proximity of the evaluated node, so as to efficiently route an intended message from a source to a destination.

Alternately, if such nodes do exist in the distributed network 100, then another determination is made ('yes' path from block 408). This determination, at block 410, involves searching for at least one immediately neighboring node having a minimum number of further neighboring nodes that are part of its own ordered set. In one implementation, the minimum number of further immediate neighbors is specified by threshold value(s) 220.

If the sleep scheduling agent 104 fails to locate any such node, conforming to the other determination ('no' path from block 408), the given evaluated node 102 is instructed by the sleep scheduling agent 104 to continue to remain awake (block 412). Alternately, if the sleep scheduling agent 104 locates at least one such node ('yes' path from block 410), the given evaluated node 102 is allowed to go to sleep.

In this manner the state of the nodes 102 is alternated between an active or awake state and an inactive or asleep state. The scheduling for the sleeping of the nodes 102 is performed at definite instance of time. A given node, say the evaluated node 102, remains awake or stays asleep until further instances of scheduling are implemented.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   communicating among multiple nodes in a distributed sensor network; and
   deriving a sleep schedule for the nodes based upon a threshold value indicative of an optimized geographic routing of communication among the nodes; wherein the deriving comprises:
   determining whether a given node with one or more immediate neighboring nodes, in a distributed sensor network, is part of a connected neighborhood;
   keeping the given node active if the number of the immediate neighboring nodes is less than the threshold value; and
   deactivating the given node, if the given node or one or more of the immediate neighboring nodes depend at least in part on the connected neighborhood;
   deactivating the given node when: at least one node in the immediate neighborhood of the given node has further neighboring nodes greater than the threshold value, the further neighboring nodes being member of the connected neighborhood; and
   at least two nodes in the connected neighborhood are indirectly connected to each other through connecting nodes lying within an n-hop neighborhood of the given node, the connecting nodes having rank values less than the rank value of the given node.

2. The method of claim 1, wherein the determining comprises:
   associating a rank value with each of the nodes;
   communicating the rank value between the given node and the immediate neighboring nodes; and
   associating the given node with the connected neighborhood, wherein the connected neighborhood comprises immediate neighboring nodes of rank value less than the rank value of the given node.

3. The method of claim 2, wherein the rank value is a randomly generated value.

4. The method of claim 1 comprising, deactivating the given node when:
   at least one node in the immediate neighborhood of the given node has further neighboring nodes greater than the threshold value, the further neighboring nodes being member of the connected neighborhood; and
   at least two nodes in the connected neighborhood are directly connected to each other.

5. The method of claim 4, wherein the further neighboring nodes are immediate neighbors to the immediate neighboring nodes.

6. The method of claim 1, wherein the connecting nodes lie within a two-hop neighborhood of the given node.

7. One or more computer readable media storing computer-executable instructions that, when executed, perform acts comprising:
   associating an order with each node in a distributed network;
   exchanging the order between a given node and its immediate neighboring nodes, such that the given node is aware of the orders of the immediate neighboring nodes; and
   associating the given node with a collection set, wherein the collection set comprises immediate neighboring nodes of order less than the order of the given node;
   constraining the given node to remain active, if the number of the immediate neighboring nodes is less than a predefined value; and
   rendering the given node to inactive state, if the given node or one or more of the immediate neighboring nodes depend at least in part on the collection set;
   instructions for rendering the given node to an inactive state when:
   at least one node in the immediate neighborhood of the given node has further neighboring nodes greater than the predefined value, the further neighboring nodes being member of the collection set; and
   at least two nodes in the collection set are indirectly connected to each other through intermediate nodes lying within an n-hop neighborhood of the given node, the intermediate nodes having orders less than the order of the given node.

8. The computer-readable media of claim 7, comprising instructions for rendering the given node to an inactive state when:
  at least one node in the immediate neighborhood of the given node has further neighboring nodes greater than the predefined value, the further neighboring nodes being members of the collection set; and
  at least two nodes in the collection set are directly connected to each other.

9. The computer-readable media of claim 8, wherein the further neighboring nodes and the immediate neighboring nodes are adjacent to each other.

10. The computer-readable media of claim 7, wherein the intermediate nodes lie within a two-hop neighborhood of the given node.

11. The computer-readable media of claim 7, wherein the orders for all nodes in the distributed network are generated randomly.

12. The computer-readable media of claim 7, wherein the predefined value is chosen on the basis of a sought geographic routing performance.

13. A system comprising:
  a plurality of nodes communicating with one another, forming a distributed network; and
  a scheduling module resident within each node, wherein the scheduling module:
    determines whether a given node with one or more neighboring nodes, in a distributed network, is a part of a schedule set;
    impels the given node to remain active if the number of neighboring nodes is less than a threshold value; and
    deactivates the given node if the given node or one or more of the immediate neighboring nodes, depend at least in part on the schedule set;
    wherein scheduling module deactivates the given node when:
      at least one node in the immediate neighborhood of the given node has further neighboring nodes greater than the threshold value, the further neighboring nodes being member of the schedule set; and
      at least two nodes in the schedule set are indirectly connected to each other through assisting nodes lying within an n-hop neighborhood of the given node, the assisting nodes having ranks less than the rank of the given node.

14. The system of claim 13, wherein scheduling module determines whether a given node with one or more neighboring nodes, in a distributed network, is a part of the schedule set by:
  assigning a unique randomly generated rank to the nodes of the distributed network;
  exchanging the rank between the given node and the immediate neighboring nodes, such that the given node is aware of the ranks of all the immediate neighboring nodes; and
  associating the given node with the schedule set, wherein the schedule set comprises immediate neighboring nodes of ranks less than the rank of the given node.

15. The system of claim 13, wherein scheduling module deactivates the given node when:
  at least one node in the immediate neighborhood of the given node has further neighboring nodes greater than the threshold value, the further neighboring nodes being member of the schedule set; and
  at least two nodes in the schedule set are directly connected to each other.

16. The system of claim 13, wherein the assisting nodes lie within a two-hop neighborhood of the given node.

* * * * *